Jan. 18, 1944.        J. G. LEE        2,339,575
AIR INDUCTION MEANS
Filed Oct. 25, 1941
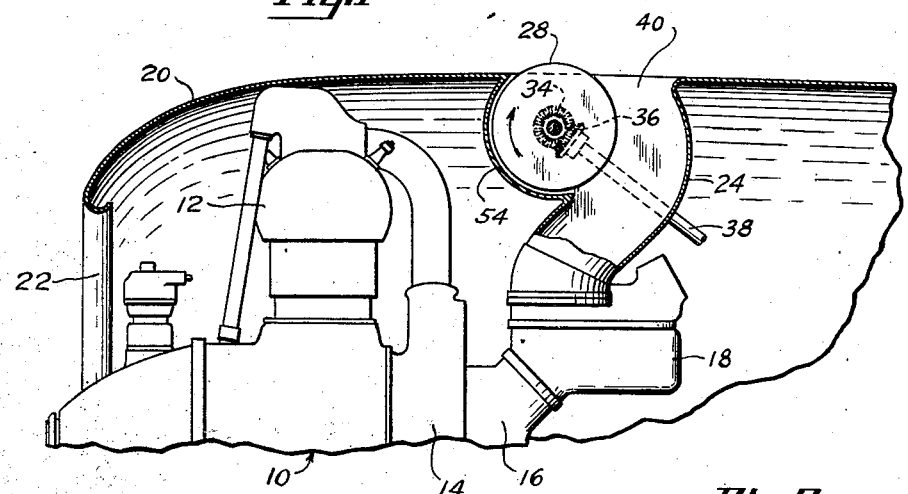
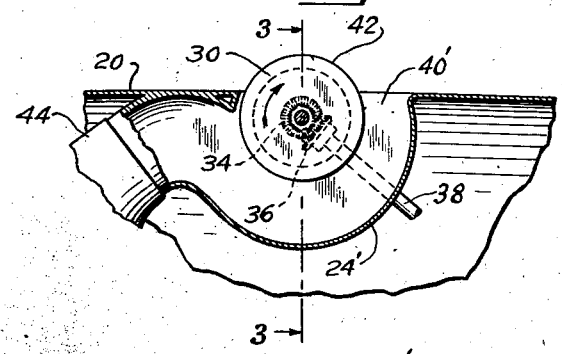
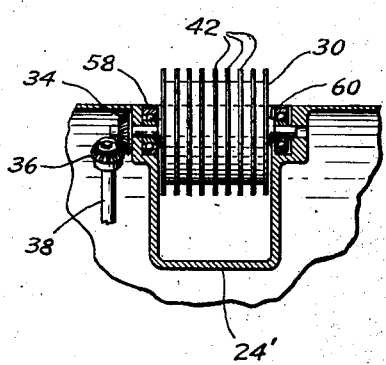
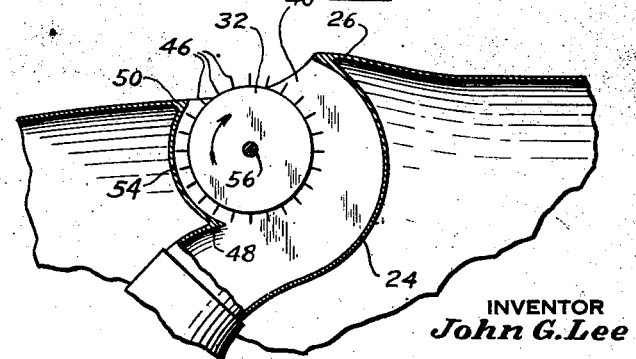
INVENTOR
*John G. Lee*
BY *Harris G. Luther*
ATTORNEY Patented Jan. 18, 1944

2,339,575

UNITED STATES PATENT OFFICE 2,339,575

AIR INDUCTION MEANS

John G. Lee, Farmington, Conn., assignor to United Aircraft Corporation, East Hartford, Conn., a corporation of Delaware Application October 25, 1941, Serial No. 416,597

15 Claims. (Cl. 230—113)

This invention relates to improvements in air flow induction and control means and has particular reference to improvements in air flow induction means for an air duct or conduit.

An object of the invention resides in the provision of means requiring little or no external power for facilitating the flow of fluid into and through a fluid duct or conduit.

A further object resides in the provision of means utilizing the flow bending effect of a rapidly rotating body in a high speed fluid stream for improving the flow of fluid into and through a fluid conduit.

Other objects and advantages will be more particularly set forth hereinafter or will become apparent as the description proceeds.

In the accompanying drawing in which like reference numerals are used to designate similar parts throughout, there is illustrated in several somewhat modified forms a suitable embodiment for the purpose of disclosing the invention. The drawing, however, is for the purpose of illustration only and is not to be taken as limiting or restricting the invention since it will be apparent to those skilled in the art that various changes in the illustrated embodiment may be resorted to without in any way exceeding the scope of the invention.

In the drawing,

Fig. 1 is a schematic view of an engine installation showing a device constructed according to the invention arranged to induce a flow of intake air to the engine.

Fig. 2 is a schematic view showing a slightly modified form of the air flow inducing device illustrated in Fig. 1.

Fig. 3 is a sectional view on the line 3—3 of Fig. 2 looking in the direction of the arrows, and Fig. 4 is a schematic view similar to Fig. 2 showing a further modified form of the air flow inducing device.

While the improved air flow induction device forming the subject matter of the invention has a large number of useful applications, it has been found particularly useful in connection with air intake ducts having their air entrance ends subjected to relatively high speed transverse air flow. An example of such a duct is illustrated as the intake air duct for an airplane engine. Such a duct would lead from the surface of some portion of the airplane, such as the engine cowl, to the engine carburetor or supercharger. It has been found that when an airplane provided with such an air intake duct is flying at high speeds, considerable difficulty is experienced in inducing a sufficient quantity of air to enter the air entrance opening of the duct and some difficulty has also been experienced in maintaining a reasonably uniform air flow across the cross-sectional area of the duct. Previous attempts to increase the quantity of air entering the ducts have generally been to provide the duct entrance with a large scoop extending beyond the airplane surface and having its open end directed into the flight induced air stream along the surface of the airplane. Such scoops not only produce a disproportionately large drag effect but have been found to become relatively inefficient at excessively high speeds due to the fact that the high speed air flow tends to flow over or around the open end of the scoop producing what is commonly referred to in the art as a "condition of separation" at the air entrance opening.

It is among the objects of the present invention to provide means for increasing the flow of air into the air entrance end of the air intake duct without requiring an excessive amount of power from the airplane power plant and without materially increasing the drag of the airplane.

Referring to the accompanying drawing, and particularly to Fig. 1, the numeral 10 generally indicates an aircraft engine having cylinders, as indicated at 12, supplied with intake air and fuel from a supercharger or blower section 14 provided with an air inlet 16 which may include a fuel introducing carburetor, such as is indicated at 18. The engine is enclosed in a streamlined cowl 20 which may be provided with a frontal opening 22 for the entrance of engine cooling air and with an air exit opening, not illustrated, of some form known to the art.

An air duct 24 leads from the exterior surface of the cowl 20 through the carburetor 18 to the supercharger intake 16. In many installations such air ducts have to be bent or provided with a bent portion intermediate their length because the space within the cowl 20 is largely filled with the engine and its accessories and it is necessary to have the duct entrance opening within some particular area of the airplane surface. This bending of the duct and the fact that there is a speed gradient through the thickness of the air flowing along the airplane surface adjacent to the duct entrance with the layer next to the surface or "boundary layer" having the slowest speed causes the air to tend to flow towards the outside of the bend and causes an unequal distribution of air pressure across the cross-sectional area of the duct which unequal air pressure disadvantageously affects the fuel metering function of the carburetor, as well as producing duct losses.

In the form of the invention shown in Figs. 1 and 2 the scoop is substantially eliminated and the air entrance opening of the ducts 24 and 24' are flush with the surface of the cowl. In Fig. 4 a slight projection 26 at the rear of the air entrance opening assists the entry of air into the duct and this extension may be applied to any installation where its effect is considered desirable or necessary.

In order to induce a flow of air into the flush or substantially flush air entrance opening of the duct shown in Figs. 1, 2 and 4, a rotary member is positioned at the forward or upstream side of the air entrance opening and may project slightly above the external surface of the cowl, the member in Fig. 1 being indicated by the numeral 28, that in Figs. 2 and 3 being indicated by the numeral 30, and that in Fig. 4 being indicated by the numeral 32. The rotor 28, shown in Fig. 1, is generally cylindrical in form and is provided with a smooth or slightly roughened surface and driven from the engine or some other suitable source of power through suitable means schematically indicated by the gears 34 and 36 and the drive shaft 38. This rotor is positioned, as stated above, at the forward side of the air entrance opening 40 and is rotated in a direction such that the surface of the rotor constituting the forward side of the air entrance opening moves in the same direction as the air flowing into the air entrance opening. Such a rotor, when rotated in the direction indicated, in the air stream flowing rearwardly over the surface of the cowl 20 causes a pronounced deflection of the air stream at the rearward side of the rotor, this deflection being in the direction of rotation and, in this instance, into the air entrance opening 40 of the duct 24 and being sufficient to induce the flow of a sufficient quantity of air into the air entrance opening. As this deflection tends to follow the rotor for a considerable angle a further effect will be to move some of the air towards the forward side of the duct 24 and thereby equalize, to a considerable extent, the distribution of air over the cross-sectional area of the ducts. This improvement in air distribution also facilitates the expansion of the air as it flows through the duct 24 (the latter increasing in area in the direction of flow, as shown) and reduces its velocity from that at the entrance opening 40 to the inlet to the carburetor 18. As the rotor 28 projects only a slight amount above the surface of the cowl and is rotated in the direction of relative air flow at a speed somewhat greater than the speed of the air stream over the cowl, the rotor will produce no appreciable increase in the drag of the airplane.

The moving surface of the rotor acts to speed up the otherwise slowly moving "boundary layer" of air so that the air adjacent to the surface of the rotor 26 is moving at approximately the same speed as the main fluid stream.

While the relatively smooth or slightly roughened surface of the rotor 28 may be sufficient in many installations to induce an adequate flow of intake air into the entrance opening of the duct 24, in some installations it has been found desirable to increase the surface area of the rotor in order to provide an increased inductive effect. This may conveniently be accomplished by providing the rotor with a series of spaced annular fins, as indicated at 42 in Figs. 2 and 3. Another method of increasing the area of the rotor in contact with the airstream is to increase the length of contact of the air with the rotor as by shortening the shroud 54 and/or bending the duct around the rotor in the manner shown in Fig. 2. In this illustrative arrangement the duct extends forwardly along the undersurface of the cowl from the air entrance opening 40' to the inlet 44 to the carburetor 18 or supercharger 14 and extends around the portion of the rotor 42 which projects within the cowl 20. This form of duct increases the angle within which the rotor is in contact with the intake air and also provides a somewhat longer space for the expansion of the air so that the inlet opening 40 can be made somewhat smaller and a higher rate of induced air flow can be utilized. The number, depth and shape of the fins 42 can be adjusted to the particular installation or some other form of area increasing extension may be used if desired. In the form of the invention shown in Figs. 2 and 3 the rotor is also driven by suitable means such as the gears 34 and 36 and the drive shaft 38 as illustrated in Fig. 1.

While the drawing shows a single rotor at the duct entrance the invention also includes the use of two or more rotors at or near the duct entrance or one or more rotors located along the duct in position to effect a smooth expansion of the air or other fluid from a smaller to a larger portion of the duct.

In the form of the invention shown in Fig. 4 a rotor 32 is arranged to be driven by the air itself rather than by external power and to this end is provided with a series of axially arranged surface extensions in the form of paddles or corrugations, as indicated at 46. The ramming effect of the cowl extension or modified scoop 26 and the conversion of the dynamic energy of the air entering the duct at the entrance opening 40" into static pressure in the lower portion of the duct will cause a pressure differential between the air in the duct at the lower side 48 of the shroud overlying the forward portion of the rotor and the upper or outer end 50 of this shroud so that some of the air entering the air entrance opening 40" will tend to flow out of the duct along the shroud 52 and will act on the extensions 46 to rotate the rotor 32. As this pressure differential can be made quite high the rotor can, by this means, be made to rotate at a speed sufficiently high to induce the desired flow of intake air into the entrance end of the duct 24.

In each case the rotor is mounted on a suitable shaft 56, preferably carried at its ends in suitable anti-friction bearings, as indicated at 58 and 60 in Fig. 3, in order that the rotor may rotate with a minimum of frictional resistance.

While a suitable mechanical embodiment in several slightly modified forms has been hereinabove described and illustrated in the accompanying drawing for the purpose of disclosing the invention, it is to be understood that the invention is not limited to the particular embodiments so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. Fluid flow inducing means for a fluid intake duct leading at a substantial angle from a surface bounding a main fluid stream comprising, a rotor located at the upstream side of the junction of said duct with said surface and projecting beyond said surface into said main fluid stream, and means for rotating said rotor.

2. The arrangement as set forth in claim 1 in which said rotor is generally cylindrical in shape and has its axis disposed transversely of the direction of flow of said main fluid stream.

3. The arrangement as set forth in claim 1 in which said rotor is driven from a source of power external to said rotor.

4. The arrangement as set forth in claim 1 in which said rotor is driven by the fluid pressure differential existing at opposite sides of said rotor.

5. The arrangement as set forth in claim 1 in which said rotor is provided with extensions to increase the surface area thereof.

6. The arrangement as set forth in claim 1 in which said rotor is provided with spaced annular fins to increase the surface area thereof.

7. The arrangement as set forth in claim 1 including rotor driving means operative to drive said rotor at a speed such that its surface velocity is at least as great as the velocity of said main fluid stream and in the same direction.

8. In combination with an air intake duct having its entrance opening substantially flush with a surface over which a stream of air is moving at high velocity, air flow inducing and pressure distributing means for said duct comprising, a rotor disposed at the upstream side of said air entrance opening with its axis transverse to said air stream extending above said surface into said air stream and extending into said duct.

9. The arrangement as set forth in claim 8 in which the portion of said rotor extending into said duct is greater than the portion extending above said surface into said air stream.

10. The arrangement as set forth in claim 8 in which said duct curves around said rotor and the major portion of the periphery of said rotor constitutes a part of the wall of said duct.

11. The arrangement as set forth in claim 8 in which said duct curves around said rotor and the major portion of the periphery of said rotor constitutes a part of the wall of said duct and the cross-sectional area of said duct gradually increases from said air entrance opening to a station at the downstream side of said rotor.

12. In an airplane having a surface over which air flows when the airplane is in flight, and an air intake duct leading from said surface into the interior of said airplane, means for inducing a flow of air into the intake duct opening comprising, a rotor mounted at the upstream side of said duct opening with its axis of rotation disposed within said airplane at the upstream side of said duct so that said rotor projects above said surface and into duct, and rotor driving means operative to give said rotor a surface speed at least as great as the speed of said air flow in a direction such that said projecting rotor portion moves with the air flowing along said surface and into said duct.

13. In combination with a fluid duct having a bent or curved portion therein constituting a duct bend, means causing a flow of fluid through said duct, and means facilitating the flow of said fluid around said bend comprising a rotor mounted on an axis extending transversely to the general direction of airflow through said bend and having a portion of its surface exposed to the flow of fluid through said duct at the inner side, or side of smaller radius, of said bend, and means for rotating said rotor at a speed sufficient to cause said surface portion to move in the direction of said airflow at a velocity greater than the velocity of said airflow over said rotor.

14. In an aircraft having a surface over which an airstream flows at a velocity approximating the velocity of said aircraft relative to the surrounding air when said aircraft is in flight, a duct extending from said surface in a direction generally transverse to the direction of flow of said airstream over said surface for passing air from said airstream to the interior of said aircraft, and means for facilitating the flow of air into said duct comprising a power operated device for altering the velocity of the air flowing into said duct at the forward side of said duct relative to the velocity of the air flowing into said duct at the rearward side of said duct, in a direction tending to equalize the velocity of said air flowing through said duct across the cross-sectional area thereof.

15. In an aircraft having a surface over which an airstream flows at a velocity approximating the velocity of the aircraft relative to the surrounding air when the aircraft is in flight, an opening in said surface, an air intake duct communicating with said opening for transferring air from said airstream to the interior of said aircraft, and means for deflecting a portion of said airstream into said duct comprising a rotatable power operated device projecting into said airstream for imparting a rotative velocity component to said portion of said airstream about an axis extending generally transversely to the general direction of flow of said airstream.

JOHN G. LEE.